Mar. 3. 1925. 1,528,620

I. KUWAHARA ET AL

ICE CREAM CONE HOLDER

Original Filed July 14, 1922

Ichizo Kuwahara
Yoshio Kajitani
INVENTOR

Patented Mar. 3, 1925.

1,528,620

UNITED STATES PATENT OFFICE.

ICHIZO KUWAHARA AND YOSHIO KAJITANI, OF SELMA, CALIFORNIA.

ICE-CREAM-CONE HOLDER.

Application filed July 14, 1922, Serial No. 575,127. Renewed December 26, 1924.

*To all whom it may concern:*

Be it known that we, ICHIZO KUWAHARA and YOSHIO KAJITANI, subjects of the Emperor of Japan, residing in Selma, in the county of Fresno, State of California, have invented new and useful Improvements in Ice-Cream-Cone Holders, of which the following is a specification.

The invention relates to ice cream cone holders or carriers, and has for its purpose, an easy and convenient means of holding or carrying two or more ice cream cones, without spilling the ice cream or dirtying the hand holding or carrying the cones.

Figure 1:
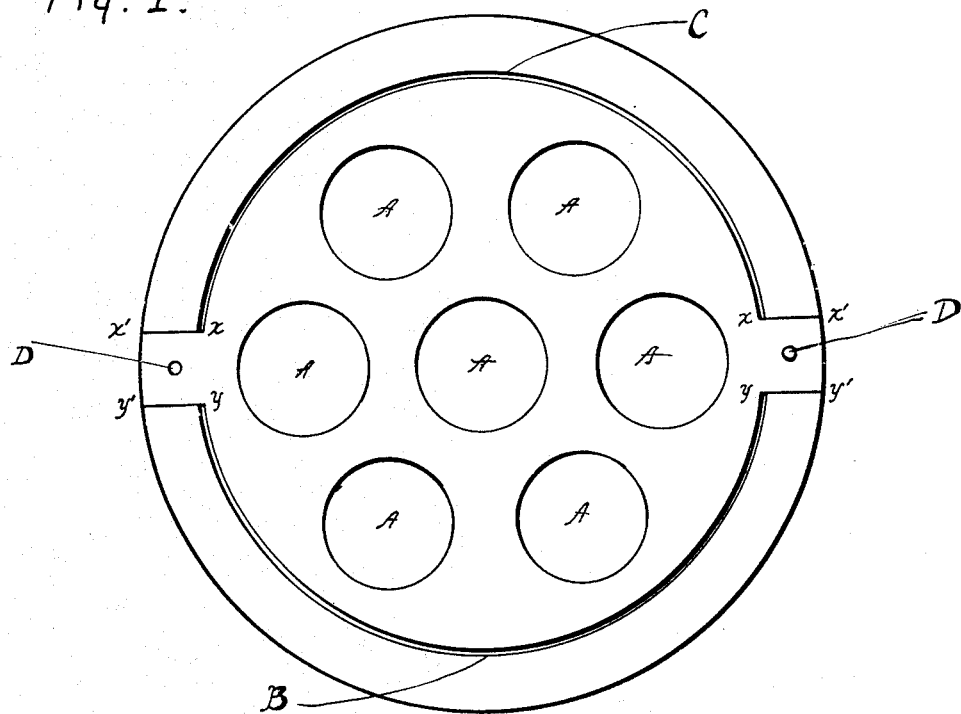

Referring to the accompanying drawing, Fig. 1 represents a top view of the ice cream cone holder which is of one piece card board or paste board, cut round. The circles A are holes in the card board of a size to permit the cones to rest in the holes. The heavy lines C and B represent cuts in the card board made parallel to the outside edge, but not going completely around; in the drawing cut C commences from $x$ and ends at $x$, and cut B from $y$ to $y$. The lines $x$ to $x'$ and $y$ to $y'$ indicate that the card board is to be scored at these places. The small holes D on opposite sides of the holders are for the purpose of inserting a rod through them to hold a plurality of cardboard forms in a stack.

Figure 2:
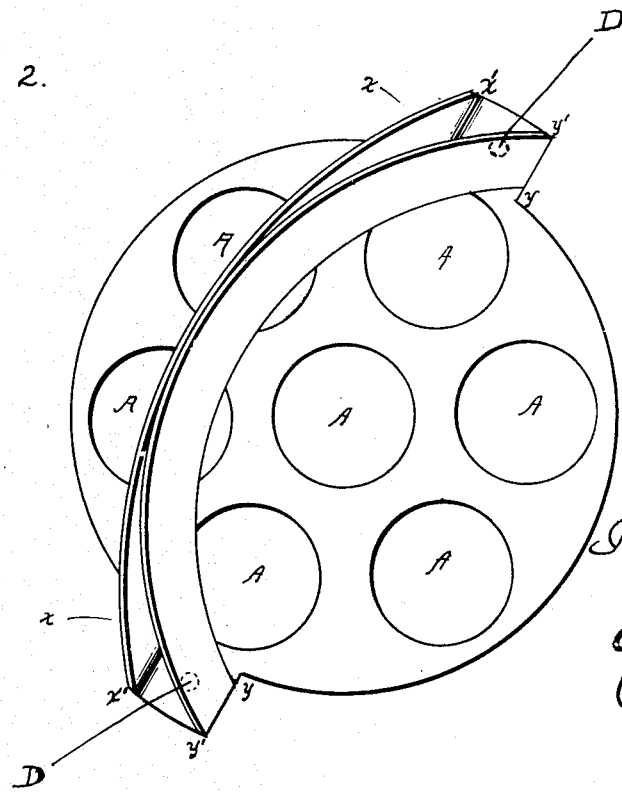

Fig. 2 of the accompanying drawing represents the ice cream cone holder, with its two free sides brought together, making a handle to the cone holder.

The portions of the card board made free by the cuts C and B are turned upward over the scoring $x—x'$ and $y—y'$ and are brought together to make a handle after the cones are inserted in the holes A.

It is understood that other means may be employed to keep the ice cream cone holder stacked properly, than a rod inserted through hole D, but it is important for the advantageous use of this invention, to have, when these cone holders are stacked, the holes A of the holders in line, so that the cones may be placed in the holes without any obstruction. In the use of this device, it is desirable to place under a stack of cone holders, an empty card board or paste board box of the size of the cone holder with depth of three or four inches and having on the top surface, holes corresponding to the hole A of the cone holder, and placed in line with the holes.

Although card board or paste board is mentioned as material for making this cone holder, any other suitable material may be used, such as tin, aluminum, zinc, etc., and although the drawing and specifications illustrate a holder of seven apertures for cones, their number may be increased or decreased according to the requirements of the trade or public. It can readily be seen that other shapes may be used. The drawing and explanation given here serve only to illustrate the principle of construction and not to limit the invention to one particular kind.

We claim as our invention:

1. An ice cream cone carrier consisting of a piece of cardboard having holes therein adapted to receive ice cream cones, the cardboard having two cuts therethrough of equal length and approximately parallel with the perimeter of the cardboard, the adjacent ends of the cuts being spaced apart, and the fabric of the cardboard being weakened in a line from the ends of each cut to the nearest edge of the board.

2. In an ice cream cone holder and carrier, a sheet of cardboard having holes therein adapted to hold ice cream cones, and having a cut on each of two opposite sides approximately of equal length and parallel with the edge of the board, the adjacent ends of the cuts being spaced distances apart, and scored lines from the ends of the cuts to the nearest edge of the board, said board being provided with a hole in the space between the adjacent ends of the cuts, substantially as described.

3. An ice cream cone holder and carrier consisting of a round piece of cardboard having a plurality of holes formed therein for the reception of cones, and having two cuts of aproximately equal length and of equal radial distances from the center of the board, the adjacent ends of the cuts being spaced apart, and the curved strips thus formed being bent upwardly and brought together at the top to form a handle.

4. An ice cream cone holder and carrier consisting of an aproximately round, flat piece of cardboard, having holes therein adapted to receive and hold cones, and having two cuts of approximately equal length, and at equal radial distances from the center of the board, the adjacent ends of the cuts being spaced apart and the board being weakened on a radial line from the ends of each cut to the periphery of the board, substantially as described.

ICHIZO KUWAHARA.
YOSHIO KAJITANI.

Witness:
OKAWARA.